United States Patent [19]
Kawashima et al.

[11] Patent Number: 5,495,233
[45] Date of Patent: Feb. 27, 1996

[54] RADIO PAGING RECEVIER CAPABLE OF IMPROVING ACCURACY OF FRAME SYNCHRONIZATION

[75] Inventors: Shinichi Kawashima; Masayuki Kushita, both of Tokyo, Japan

[73] Assignee: NEC Corporation, Tokyo, Japan

[21] Appl. No.: 230,403

[22] Filed: Apr. 20, 1994

[30] Foreign Application Priority Data

Apr. 21, 1993 [JP] Japan ..................................... 5-094631

[51] Int. Cl.$^6$ ................................. H04L 7/00; H04J 3/06
[52] U.S. Cl. .................................. 340/825.21; 340/825.2; 340/825.44; 370/105.1; 375/359
[58] Field of Search ............................ 340/825.21, 825.2, 340/825.44, 825.48; 370/100.1, 105.1, 105.5; 375/110, 359; 455/343, 38.3

[56] References Cited

U.S. PATENT DOCUMENTS

| 4,384,361 | 5/1983 | Masaki ..................................... | 455/343 |
| 4,677,433 | 6/1987 | Catlin et al. ......................... | 340/825.2 |
| 5,187,471 | 2/1993 | Wagai et al. ........................ | 340/825.44 |

FOREIGN PATENT DOCUMENTS

0509649  10/1992  European Pat. Off. ......... H04Q 7/02
2005633   1/1990  Japan.

OTHER PUBLICATIONS

European Search Report EP 94 10 6145.

*Primary Examiner*—Donald J. Yusko
*Assistant Examiner*—Edward Merz
*Attorney, Agent, or Firm*—Curtis, Whitham & McGinn Whitham

[57] ABSTRACT

In a radio paging receiver for receiving a pager signal comprising a succession of frames each of which consists of a first through n-th group of signals, a first clock generating unit generates a first clock signal having a first clock rate. A synchronization clock generating unit generates a synchronization clock signal which is synchronized with digital word data derived from a receiving section and which has a synchronization clock rate equal to the first clock rate. A selecting circuit selects one of the first clock signals and the synchronization clock signal as a selected clock signal. A counter carries out a counting operation by the use of the selected clock signal and produces a counted signal. Responsive to the counted signal, a control circuit produces a control signal to make a battery saving switch have an "on" state and to make the synchronization clock generating unit have an active state. The selecting circuit selects the synchronization clock signal while the control circuit produces the control signal.

14 Claims, 5 Drawing Sheets

RADIO PAGING RECEVIER CAPABLE OF IMPROVING ACCURACY OF FRAME SYNCHRONIZATION

BACKGROUND OF THE INVENTION

This invention relates to a radio paging receiver for receiving a pager signal comprising a call number signal and a message signal.

A recent remarkable development of an integrated circuit technique has rendered the radio paging receiver compact or portable and multifunctional. Preferably, the radio paging receiver has a long life. Inasmuch as a battery is used as a power source in the radio paging receiver, the radio paging receiver has a life time dependent upon the life of battery. Therefore, electric power must not be wasted in the radio paging receiver. In other words, useless operation should strictly be restricted. For this purpose, a battery saving operation is carried out in such a radio paging receiver.

As an example of the radio paging receiver, a synchronous type is well known in the art. In the synchronous type, the radio paging receiver receives a pager signal comprising a succession of frames each of which has a frame period Ft and which consists of first through n-th group signals where n represents a positive integer greater than unity. Each of the first through the n-th group signals has a signal duration Dt and comprises a call number signal representative of a call number and a message signal representative of a message.

As known in the art, the radio paging receiver has a preassigned call number which belongs to one of the first through the n-th group signal. The radio paging receiver comprises a receiving section for receiving the pager signal, a battery saving switch connected between a battery and the receiving section, and a control unit for controlling said battery saving switch. The battery saving switch has on and off states and supplies electric power to said receiving section in the on state. The control unit puts the battery saving switch into the on state so that the receiving section receives only the one of the first through the n-th group signals to which the preassigned call number belongs. In other words, the receiving section periodically carries out a receiving operation at the frame period Ft and receives the one of the first through the n-th group signals as a reception group signal. This means that the battery saving operation is carried out in the radio paging receiver. Thus, the control unit serves as a switch driving unit for carrying out the battery saving operation.

The receiving section supplies the reception group signal to the control unit. The control unit carries out a decision operation whether or not the reception group signal contains the call number signal representative of the call number which is coincident with the preassigned call number. Namely, the control unit also serves as a decision unit for carrying out the decision operation. If the reception group signal contains the call number which is coincident with the preassigned call number, the control unit further carries out a decoding operation of the message signal to obtain the message represented by the message signal. As a result of the decoding operation, the control unit energizes a speaker or drives a display unit in order to display the message. Such a radio paging receiver is disclosed in Japanese Unexamined Patent Publication Tokkai Hei 2-5633, namely, 5633/1990 and is suitable for receiving the pager signal having a data transmission rate of 1200 (bps) at most.

In the meanwhile, it is required that the decoding operation is carried out in high speed as the data transmission rate is increased. In this event, the control unit requires a clock signal having a high clock rate in order to establish a frame synchronization. Under the circumstances, the radio paging receiver further comprises first and second clock signal generating circuits which are for generating first and second clock signals, respectively. The first clock signal has a first clock rate while the second clock signal has a second clock rate higher than the first clock rate. The control unit operates in synchronism with the first clock signal while the control unit puts the battery saving switch into the off state. The control unit carries out the decision operation in synchronism with the first clock signal. If the control unit decides that the reception group signal contains the call number which is coincident with the preassigned call number, the control unit carries out the decoding operation in synchronism with the second clock signal. When the control unit operates in high speed, the control unit increases in power consumption. This means that the radio paging receiver has a degraded battery saving effect. In addition to the degraded battery saving effect, it is hard to establish a frame synchronization as the data transmission rate is increased.

SUMMARY OF THE INVENTION

It is therefore an object of this invention to provide a radio paging receiver which is capable of improving accuracy of frame synchronization regardless of increment of a data transmission rate.

It is another object of this invention to provide the radio paging receiver without degradation of a battery saving effect.

Other objects of this invention will become clear as the description proceeds.

On describing the gist of this invention, it is possible to understand that a radio paging receiver is for use in responding to a pager signal comprising a succession of frames each of which has a frame period and which consists of first through n-th group signals where n represents a positive integer greater than unity. Each of the first through the n-th group signals has a signal duration and comprises a call number signal representative of a call number. The radio paging receiver has a preassigned call number which belongs to one of the first through the n-th group signals. The radio paging receiver comprises receiving means for receiving the pager signal to demodulate the pager signal into a digital signal which comprises a sequence of digital word data, switch means connected between a battery and the receiving means and having on and off states to supply electric power from the battery to the receiving means in the on state, and control means for controlling the switching means to put into the on state during reception of the one of the first through the n-th group signals.

According to an aspect of the present invention, the control means comprises first clock generating means for generating a first clock signal having a first clock rate, synchronization clock generating means for generating a synchronization clock signal synchronized with the sequence of digital word data. The synchronization clock signal has a synchronization clock rate equal to the first clock rate. The control means further comprises a selecting circuit connected to the first clock signal generating means and to the synchronization clock generating means for selecting one of the first clock signal and the synchronization clock signal as a selected clock signal. A counter is connected to the selecting circuit for counting the frame period by the use of the selected clock signal to produce a counted signal indicative of a beginning and an ending of the one of the first through the n-th group signals a control circuit is connected to the counter for producing a control signal which lasts from the beginning of the one of the first through the n-th group signals to the ending of the one of the first through the n-th group signals to make the switch means have the on state and to make the synchronization clock generating means generate the synchronization clock signal. The selecting circuit is connected to the control circuit and selects the synchronization clock signal as the selected clock signal while the control circuit produces the control signal.

DESCRIPTION OF THE PREFERRED EMBODIMENT

Figure 1:
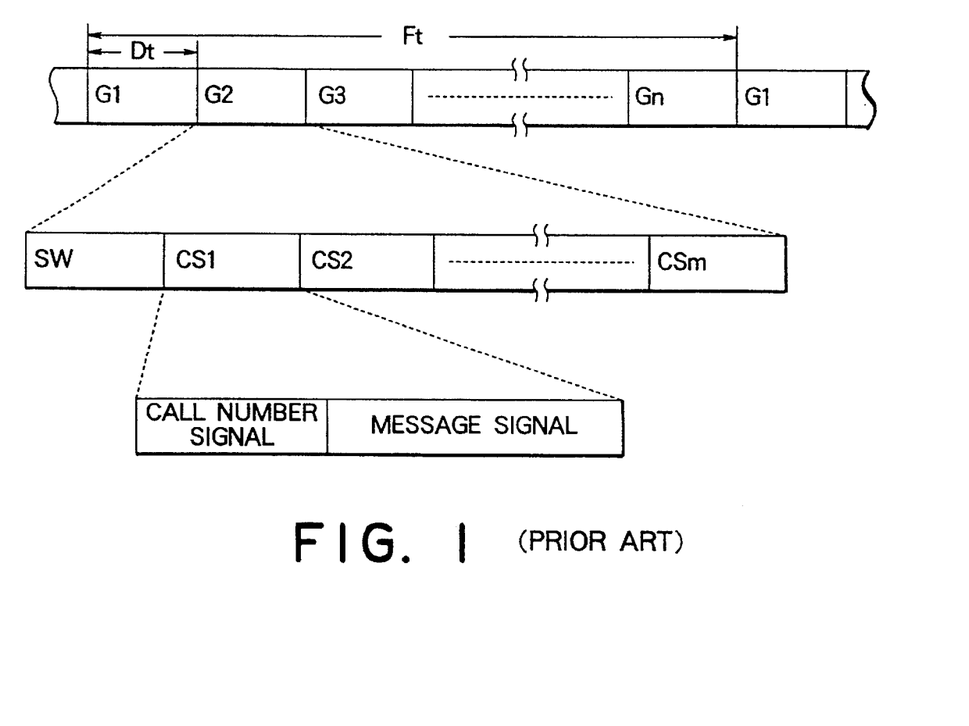
FIG. 1 shows a format of a pager signal.

Referring to FIG. 1, a format of a pager signal will be described at first in order to facilitate an understanding of this invention. The pager signal is used for a synchronous type. As shown in a top line of FIG. 1, the pager signal comprises a succession of frames each of which has a frame period Ft and which consists of first through n-th group signals G1 to Gn where n represents a first positive integer greater than unity. As illustrated in a second line of FIG. 1, each of the first through the n-th group signals G1 to Gn has a signal duration Dt and comprises a synchronization word signal SW located at a head thereof and first through m-th call signals CS1 to CSm where m represents a second positive integer greater than unity. Each of the first through the m-th call signals CS1 to CSm comprises a call number signal representative of a call number and a message signal representative of a message as shown in a bottom line of FIG. 1.

Figure 2:
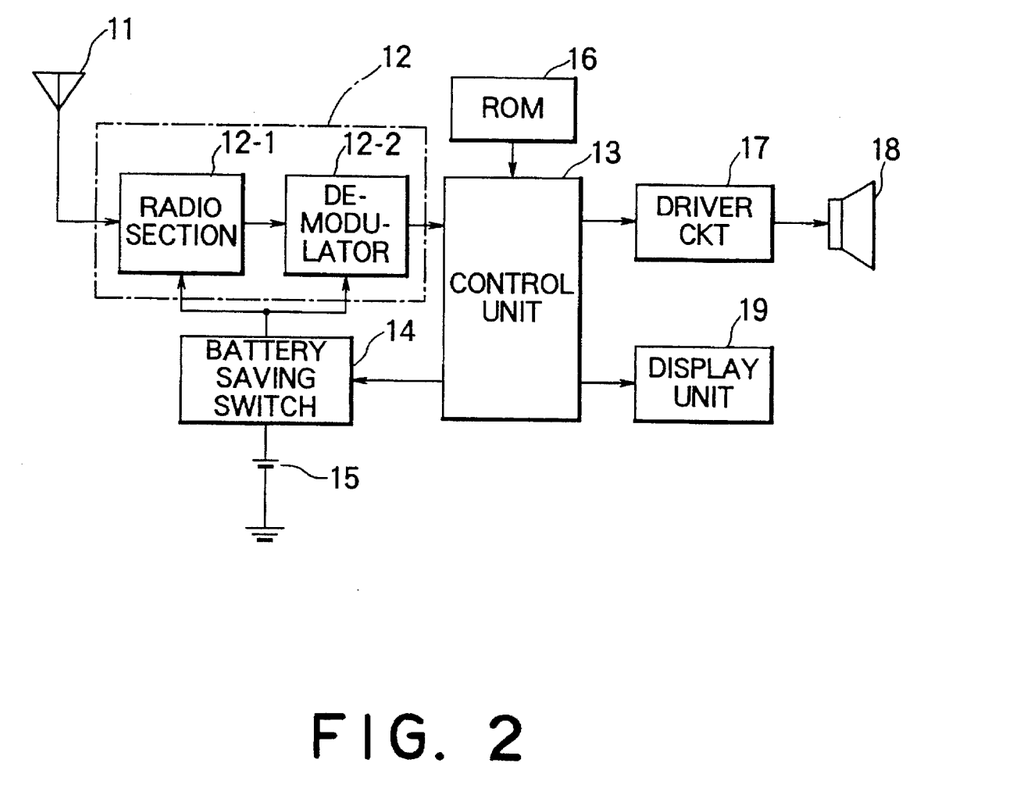
FIG. 2 shows a block diagram of a radio paging receiver according to a preferred embodiment of this invention.

Referring to FIG. 2, the description will be made as regards a radio paging receiver according to an embodiment of this invention. The radio paging receiver is of the synchronous type and is for receiving the pager signal which is mentioned above and which is transmitted from a paging transmitter or a base station in a modulation manner known in the art. The radio paging receiver receives the pager signal through an antenna 11. The radio paging receiver has a preassigned call number which belongs to one of the first through the n-th group signals G1 to Gn. The radio paging receiver comprises a receiving section 12, a control unit 13, a battery saving switch 14 connected between a battery 15 and the receiving section 12, and a read-only memory (ROM) 16 in which the preassigned call number is preliminarily memorized. The radio paging receiver further comprises a driver circuit 17, a speaker 18 for generating an announce tone, and a display unit 19 for displaying a message.

The receiving section 12 comprises a radio section 12-1 and a demodulator 12-2. The radio section 12-1 is operated to receive the pager signal. The demodulator 12-2 is operated to demodulate the pager signal into a demodulated signal. The demodulated signal is a digital signal which comprises a sequence of digital word data corresponding to the synchronization word signal SW and the first through the m-th call signals CS1 to CSm. The battery saving switch 14 has on and off states and connects the battery 15 to the receiving section 12 in the on state. The receiving section 12 can receive the pager signal only when the battery saving switch 14 is put into the on state. In a manner disclosed in the reference cited in the background of the invention, the control unit 13 carries out a synchronization pull-in (e.g., synchronization establishment) operation at an initial state. After completion of the synchronization pull-in operation, the control unit 13 controls the battery saving switch 14 so that the receiving section 12 receives only one of the first through the n-th group signals G1 to Gn to which the preassigned call number belongs.

It will be assumed that the pressigned call number belongs to the first group signal G1. In this event, the control unit 13 puts the battery saving switch 14 into the on state so that the receiving section 12 receives only the first group signal G1. Strictly speaking, the control unit 13 supplies a control signal to the battery saving switch 14 to make the battery saving switch 14 have the on state. The control signal lasts during the signal duration Dt defined by a beginning of the first group signal G1 and an ending of the first group signal G1. The receiving section 12 demodulates the first group signal G1 and delivers a first digital signal to the control unit 13 as the demodulated signal. The first digital signal comprises the sequence of digital word data corresponding to the first group signal G1.

Supplied with the first digital signal, the control unit 13 carries out a decoding operation in the manner known in the art to obtain a first decoded signal. The control unit 13 comprises a central processing unit (CPU) or a microprocessor for carrying out a decision operation whether or not the first decoded signal contains the call number which is coincident with the preassigned call number memorized in the read-only memory 16. If the first decoded signal contains the call number coincident with the preassigned call number, the control unit 13 drives the speaker 18 through the driving circuit 17 so that the speaker 18 generates the announce tone. By the use of the first decoded signal, the central processing unit further discriminates the message represented by the message signal following the call number signal and displays the message on the display unit 19.

Referring to FIGS. 3 and 4A to 4D, the description will proceed to the control unit 13. The control unit 13 comprises a first clock generating unit 21 for generating a first clock signal C1 having a first clock rate fl and a synchronization clock generating unit 22 for generating a synchronization clock signal C2 having a synchronization clock rate equal to the first clock rate fl. As will become clear, the synchronization clock signal C2 is in synchronism with the sequence of digital word data delivered from the receiving section 12. The first clock generating unit 21 comprises a first oscillator 21-1 and a clock generator 21-2. The synchronization clock generating unit 22 comprises a second clock generating unit 23, a bit synchronization circuit 24, and a frequency divider 25. The second clock generating unit 23 comprises a second oscillator 23-1 and a synchronization clock generator 23-2.

Figure 3:
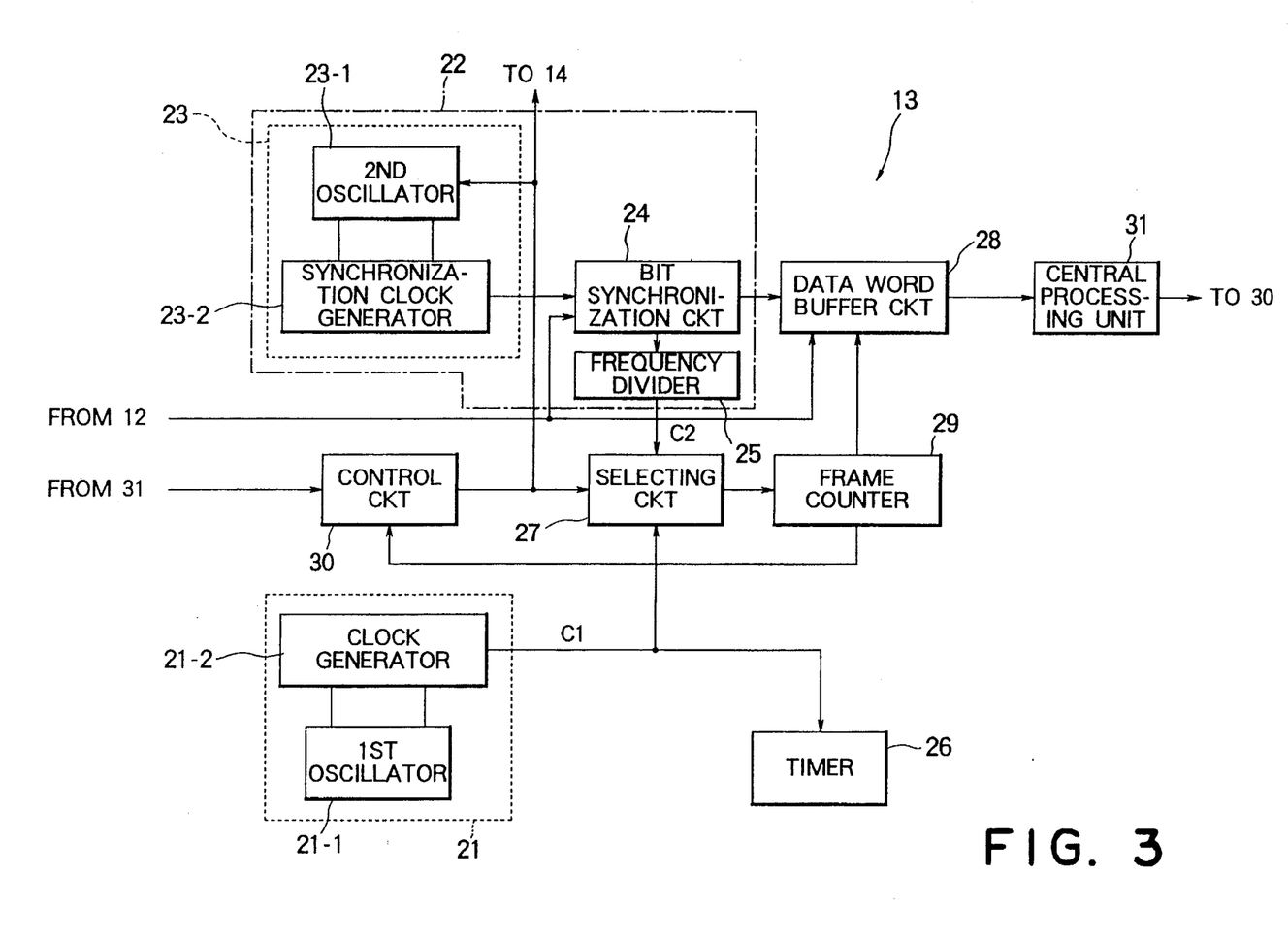
FIG. 3 shows a block diagram of a control unit illustrated in FIG. 2.

The description will be made on the assumption that the preassigned call number belongs to the first group signal G1 (FIG. 4A) similar to that described in conjuction with FIG. 2. In the first clock generating unit 21, the first oscillator 21-1 generates a first oscillation clock signal having a first oscillation clock rate higher than the first clock rate fl. The first oscillator 21-1 keeps generation of the first oscillation clock signal regardless of operation of the receiving section 12 (FIG. 2). The clock generator 21-2 is implemented by a frequency divider for frequency dividing the first oscillation clock signal into a first frequency divided signal. The first frequency divided signal is supplied, as the first clock signal C1, to a timer 26 and a selecting circuit 27.

In the second clock generating unit 23, the second oscillator 23-1 generates a second oscillation clock signal having a second oscillation clock rate higher than the first oscillation clock rate. As will become clear as the description proceeds, the second oscillator 23-1 generates the second oscillation clock signal only when the receiving section 12 receives the first group signal G1. This is because the preassigned call number belongs to the first group signal G1. The synchronization clock generator 23-2 is implemented by a frequency divider and frequency dividing the second oscillation clock signal into a second frequency divided signal. The second frequency divided signal has a second clock rate f2 higher than the first clock rate f1 and may be called a second clock signal.

The bit synchronization circuit 24 is supplied with the second frequency divided signal and the sequence of digital word data delivered from the receiving section 12. The bit synchronization circuit 24 carries out bit synchronization operation of the second frequency divided signal with the sequence of digital word data to produce first and second synchronized clock signals. The first synchronized clock signal is supplied to a data word buffer circuit 28 while the second synchronized clock signal is supplied to the frequency divider 25. The frequency divider 25 is for frequency dividing the second synchronized clock signal into a frequency divided signal. The frequency divided signal is supplied to the selecting circuit 27 as the synchronization clock signal C2.

Figure 4A:
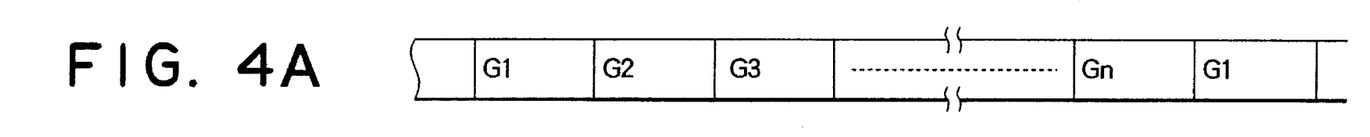
FIGS. 4A to 4D are time charts for use in describing an operation of the control unit illustrated in FIG. 3.
Figure 4B:
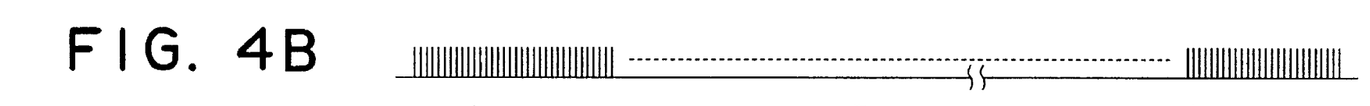

The selecting circuit 27 is supplied with the first clock signal C1 and the synchronization clock signal C2 and is for selecting one of the first clock signal C1 and the synchronization clock signal C2 as a selected clock signal and supplies the selected clock signal to a frame counter 29. The frame counter 29 is for counting the frame period Pt by the use of the selected clock signal to produce a counted signal as illustrated in FIG. 4B. It should be noted here that a beginning and an ending of one frame of the pager signal can be indicated by the counted signal because the frame period Ft (FIG. 1) is shown beforehand. Furthermore, a beginning and an ending of each of the first through the n-th group signals G1 to Gn can be indicated by the counted signal because the signal duration Dt (FIG. 1) of each of the first through the n-th group signals G1 to Gn is also known beforehand. This means that a reception time period of each of the first through the n-th group signals G1 to Gn can be decided by the use of the counted signal.

The counted signal is supplied to the data word buffer circuit 29 and a control circuit 30. The data word buffer circuit 28 is supplied with the first synchronized clock signal, the sequence of digital word data, and the counted signal and extracts word data from the sequence of digital word data word by word in synchronism with the first synchronized clock signal. The word data are supplied to the central processing unit depicted at 31.

Figure 4C:
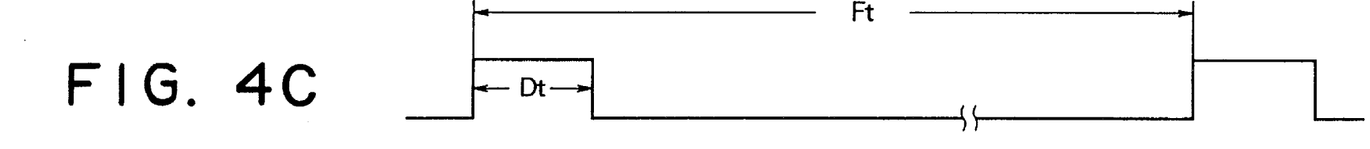

The control circuit 30 is supplied from the central processing unit 31 with an instruction signal instructing the fact that the preassigned call number belongs to the first group signal G1. The control circuit 30 is for controlling the battery saving switch 14 (FIG. 2), the second oscillator 23-1, and the selecting circuit 27 in response to the counted signal. By the use of the counted signal and the instruction signal, the control circuit 30 produces the control signal which lasts from a beginning of the first group signal G1 to an ending of the first group signal G1 as illustrated in FIG. 4C. The control signal serves to make the battery saving switch 14 have the on state and to make the second oscillator 23-1 generate the second oscillation clock signal and further to make the selecting circuit 27 select the synchronization clock signal C2 as the selected clock signal.

Figure 4D:
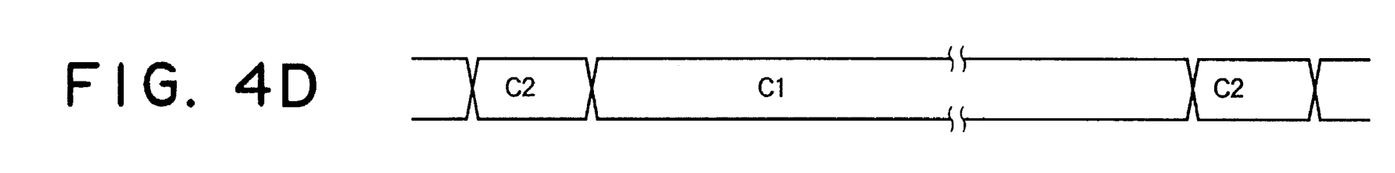
Figure 5A:
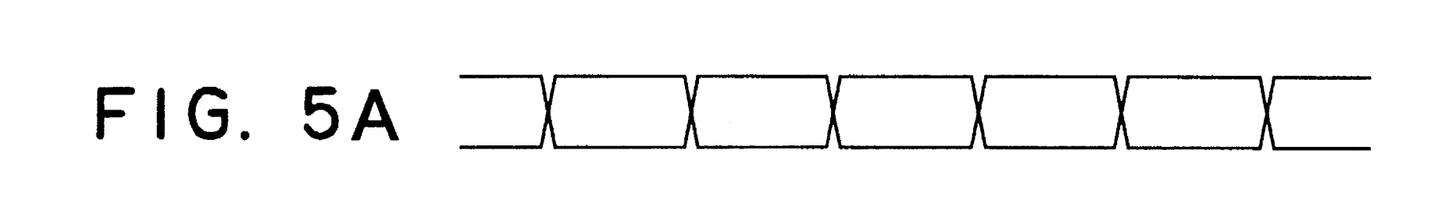
FIGS. 5A to 5C are time charts for use in describing relation between a first clock signal and a synchronization clock signal both of which are generated in the control unit illustrated in FIG. 3.
Figure 5B:
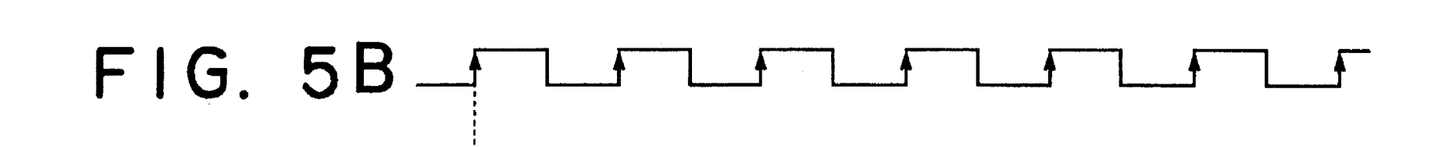
Figure 5C:
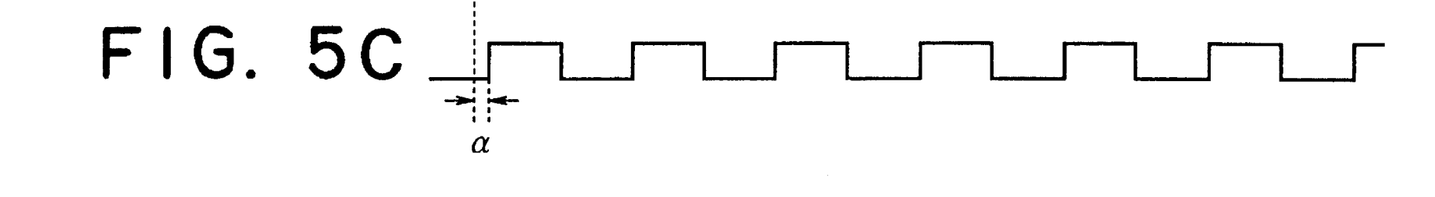

Referring to FIGS. 5A to 5C together with FIGS. 3 and 4A to 4D, the description will be made as regards the operation of the control unit 13. In the example, it will be assumed that the synchronization pull-in operation has been completed and that the selecting circuit 27 selects the first clock signal C1 as the selected clock signal. At this time, the battery saving switch 14 and the second oscillator 23-1 are put into the off state. The frame counter 29 carries out a count operation by the use of the first clock signal C1 and produces the counted signal representative of the counted value. At the ending of one frame, namely, the ending of the n-th group signal Gn of the pager signal, the counted value is reset to zero. Simultaneously, the frame counter 29 starts again the counting operation from the beginning of the first group signal G1 of a next frame succeeding to the one frame.

Supplied with the counted signal representative of the counted value of zero, the control circuit 30 produces the control signal because the control circuit 30 has been received the instruction signal instructing the fact that the preassigned call number belongs to the first group signal G1. The control signal is supplied to the battery saving switch 14, the second oscillator 23-1, and the selecting circuit 27. The battery saving switch 14 is put into the on state by the control signal. Supplied with the control signal, the second oscillator 23-2 starts generation of the second oscillation clock signal. As a result, the synchronization clock generating unit 22 generates the synchronization clock signal C2. Simultaneously, the selecting circuit 27 changes the clock signal from the first clock signal C1 to the synchronization clock signal C2 as shown in FIG. 4D. The frame counter 29, therefore, carries out the count operation by the use of the synchronization clock signal C2.

It is to be noted here that the synchronization clock signal C2 illustrated in FIG. 5B is in synchronism with the sequence of digital word data illustrated in FIG. 5A. This is because the bit synchronization operation is carried out by the bit synchronization circuit 24. On the contrary, the first clock signal C1 may have a phase difference α relative to the synchronization clock signal C2 as shown in FIG. 5C. This means that accuracy of the frame synchronization can be improved and that the data word buffer circuit 28 can correctly extract the word data from the sequence of digital word data word by word because the data word buffer circuit 28 uses the counted signal synchronized with the sequence of digital word data and the first synchronized clock signal derived from the bit synchronization circuit 24. Furthermore, it is possible to receive the pager signal having the data transmission rate of 2400 (bps) or more.

After lapse of the signal time duration Dt, the counted value indicates the ending of the first group signal G1. In this event, the control circuit 30 stops supply of the control signal. At that time, the battery saving switch 14 is put into the off state. As a result, the receiving section 12 receives only the first group signal G1 of the pager signal. The second oscillator 23-1 stops generation of the second oscillation clock signal. This means that the battery saving effect can be improved because the second oscillator 23-1 operates only upon reception of the first group signal G1. In the selecting circuit 27, the selected clock signal is changed from the synchronization clock signal C2 to the first clock signal C1 as shown in FIG. 4D. This state lasts until the frame counter 29 counts up the frame period Ft, namely, until the counted value indicates the ending of the next frame. When the frame counter 29 counts up the frame period Ft, a similar operation mentioned above is repeated.

While this invention has thus far been described in conjunction with a preferred embodiment thereof, it will readily be possible for those skilled in the art to put this invention into practice in various other manners.

What is claimed is:

1. A radio paging receiver for use in responding to a pager signal comprising a succession of frames each of which has a frame period and which comprises first through n-th group signals where n represents a positive integer greater than unity, each of said first through said n-th group signals having a signal duration and comprising a call number signal representative of a call number, said radio paging receiver having a preassigned call number which belongs to one of said first through said n-th group signals and comprising receiving means for receiving said pager signal to demodulate said pager signal into a digital signal which comprises a sequence of digital word data, switching means connected between a battery and said receiving means and having on and off states to supply electric power from said battery to said receiving means in said on state, and control means for controlling said switching means to put into said on state during reception of said one of the first through the n-th group signals, said control means comprising:

first clock signal generating means for generating a first clock signal having a first clock rate;

synchronization clock generating means for generating a synchronization clock signal synchronized with said sequence of digital word data, said synchronization clock signal having a synchronization clock rate equal to said first clock rate;

a selecting circuit connected to said first clock signal generating means and said synchronization clock generating means for selecting one of said first clock signal and said synchronization clock signal as a selected clock signal;

a counter connected to said selecting circuit for counting said frame period by the use of said selected clock signal to produce a counted signal indicative of a beginning and an ending of said one of the first through the n-th group signals; and a control circuit connected to said counter for producing a control signal which lasts from said beginning of the one of the first through the n-th group signals to said ending of the one of the first through the n-th group signals to make said switching means have said on state and to make said synchronization clock generating means generate said synchronization clock signal, said selecting circuit being connected to said control circuit and selecting said synchronization clock signal as said selected clock signal while said control circuit produces said control signal.

2. A radio paging receiver as claimed in claim 1, wherein said synchronization clock generating means comprises:

second clock generating means for generating a second clock signal having a second clock rate, said second clock rate having a rate higher than that of said first clock rate;

a bit synchronization circuit connected to said second clock generating means and said receiving means for carrying out a bit synchronization operation of said second clock signal with said sequence of digital word data to produce a synchronized clock signal; and a frequency divider connected to said bit synchronization circuit for frequency dividing said synchronized clock signal to produce a frequency divided signal as said synchronization clock signal.

3. A radio paging receiver as claimed in claim 1, wherein said synchronization clock generating means comprises:

second clock generating means for generating a second clock signal having a second clock rate, said second clock rate having a rate higher than that of said first clock rate.

4. A radio paging receiver as claimed in claim 3, wherein said synchronization clock generating means further comprises:

a bit synchronization circuit connected to said second clock generating means and said receiving means for carrying out a bit synchronization operation of said second clock signal with said sequence of digital word data to produce a synchronized clock signal.

5. A radio paging receiver as claimed in claim 4, wherein said synchronization clock generating means further comprises:

a divider connected to said bit synchronization circuit for dividing said synchronized clock signal to produce a divided signal as said synchronization clock signal.

6. A radio paging receiver as claimed in claim 3, wherein said second clock generating means is in the off state except when the control signal is output by said control circuit.

7. A radio paging receiver for use with a power source and for use in responding to a pager signal comprising a succession of frames each of which has a frame period and which comprises first through n-th group signals where n represents a positive integer greater than unity, each of said first through said n-th group signals having a signal duration and comprising a call number signal representative of a call number, said radio paging receiver having a preassigned call number which belongs to one of said first through said n-th group signals, said radio paging receiver comprising:

receiving means for receiving said pager signal to demodulate said pager signal into a digital signal which comprises a sequence of digital word data;

switching means connected between the power source and said receiving means and having on and off states to supply power from said power source to said receiving means in said on state; and control means for controlling said switching means to put into said on state during reception of said one of the first through the n-th group signals, said control means comprising:

first clock signal generating means for generating a first clock signal having a first clock rate;

synchronization clock generating means for generating a synchronization clock signal synchronized with said sequence of digital word data, said synchronization clock signal having a synchronization clock rate equal to said first clock rate;

a selecting circuit connected to said first clock signal generating means and said synchronization clock generating means for selecting one of said first clock signal and said synchronization clock signal as a selected clock signal;

a counter connected to said selecting circuit for counting said frame period by the use of said selected clock signal to produce a counted signal indicative of a beginning and an ending of said one of the first through the n-th group signals; and a control circuit connected to said counter for producing a control signal which lasts from said beginning of the one of the first through the n-th group signals to said ending of the one of the first through the n-th group signals to make said switching means have said on state and to make said synchronization clock generating means generate said synchronization clock signal.

8. A radio paging receiver as claimed in claim 7, wherein said selecting circuit is connected to said control circuit and selects said synchronization clock signal as said selected clock signal while said control circuit produces said control signal.

9. A radio paging receive as claimed in claim 7, wherein synchronization clock generating means comprises:

second clock generating means for generating a second clock signal having a second clock rate, said second clock rate having a rate higher than that of said first clock rate;

a bit synchronization circuit connected to said second clock generating means and said receiving means for carrying out a bit synchronization operation of said second clock signal with said sequence of digital word data to produce a synchronized clock signal; and a frequency divider connected to said bit synchronization circuit for frequency dividing said synchronized clock signal to produce a frequency divided signal as said synchronization clock signal.

10. A radio paging receiver as claimed in claim 8, wherein said synchronization clock generating means comprises:

second clock generating means for generating a second clock signal having a second clock rate.

11. A radio paging receiver as claimed in claim 10, wherein said second clock rate has a rate higher than that of said first clock rate.

12. A radio paging receiver as claimed in claim 10, wherein said synchronization clock generating means further comprises:

a bit synchronization circuit connected to said second clock generating means and said receiving means for carrying out a bit synchronization operation of said second clock signal with said sequence of digital word data to produce a synchronized clock signal.

13. A radio paging receiver as claimed in claim 12, wherein said synchronization clock generating means further comprises:

a divider connected to said bit synchronization circuit for dividing said synchronized clock signal to produce a divided signal as said synchronization clock signal.

14. A radio paging receiver as claimed in claim 10, wherein said second clock generating means is in the off state except when the control signal is output by said control circuit.

* * * * *